United States Patent
Yang et al.

(10) Patent No.: US 11,828,355 B1
(45) Date of Patent: Nov. 28, 2023

(54) DISCONNECTOR APPARATUS

(71) Applicant: Hyundai Transys Inc., Seosan-si (KR)

(72) Inventors: Se Dong Yang, Hwaseong-si (KR); Jong Bae Ahn, Hwaseong-si (KR); Sangheon Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 17/962,916

(22) Filed: Oct. 10, 2022

(51) Int. Cl.
| | |
|---|---|
| *F16H 48/24* | (2006.01) |
| *F16H 48/40* | (2012.01) |
| *F16H 48/08* | (2006.01) |
| *F16H 48/34* | (2012.01) |

(52) U.S. Cl.
CPC ............ *F16H 48/24* (2013.01); *F16H 48/08* (2013.01); *F16H 48/40* (2013.01); *F16H 2048/343* (2013.01)

(58) Field of Classification Search
CPC .... F16H 48/24; F16H 2025/204; F16H 25/20; F16H 25/2285; F16H 25/22–2025
See application file for complete search history.

(56) References Cited

U.S. PATENT DOCUMENTS

| | | | | |
|---|---|---|---|---|
| 6,966,863 | B2 * | 11/2005 | Teraoka .................. | H02K 7/108 |
| | | | | 475/154 |
| 11,402,006 | B2 * | 8/2022 | Hirota ..................... | F16H 48/22 |

FOREIGN PATENT DOCUMENTS

| | | | |
|---|---|---|---|
| JP | 2013044406 A | * | 3/2013 |
| KR | 101530485 B1 | * | 6/2015 |
| KR | 10-2017-0123869 A | | 11/2017 |

* cited by examiner

*Primary Examiner* — Ernesto A Suarez
*Assistant Examiner* — James J Taylor, II
(74) *Attorney, Agent, or Firm* — Bridgeway IP Law Group, PLLC; Jihun Kim (57) ABSTRACT

Proposed is a disconnector apparatus including a support ring mounted in a casing and including a pinion gear mounted in the support ring and configured to engage with a first side gear, the support ring including a first dog gear part provided on one surface directed toward the first side gear, a clutch ring including a second dog gear part provided on one surface facing the support ring, the second dog gear part being configured to engage with the first dog gear part, and a sleeve connected to an actuator device and configured to move in an engagement direction or disengagement direction, the sleeve being connected to the clutch ring and configured to push the clutch ring in a direction toward the support ring or pull the clutch ring in a direction opposite to the support ring.

9 Claims, 5 Drawing Sheets

FIG. 1

PRIOR ART

DISCONNECTOR APPARATUS

CROSS-REFERENCE TO RELATED APPLICATIONS

This application claims priority to and the benefit of Korean Patent Application No. 10-2022-0094681 filed in the Korean Intellectual Property Office on Jul. 29, 2022, the entire contents of which are incorporated herein by reference.

TECHNICAL FIELD

The present invention relates to a disconnector apparatus that switches from four-wheel drive to two-wheel drive.

BACKGROUND ART

In general, a disconnector apparatus refers to an apparatus mounted in a differential assembly and capable of minimizing an unnecessary loss of power by switching between two-wheel drive (2WD) and four-wheel drive (4WD) by engaging or disengaging a differential shaft depending on a traveling situation.

Figure 1:
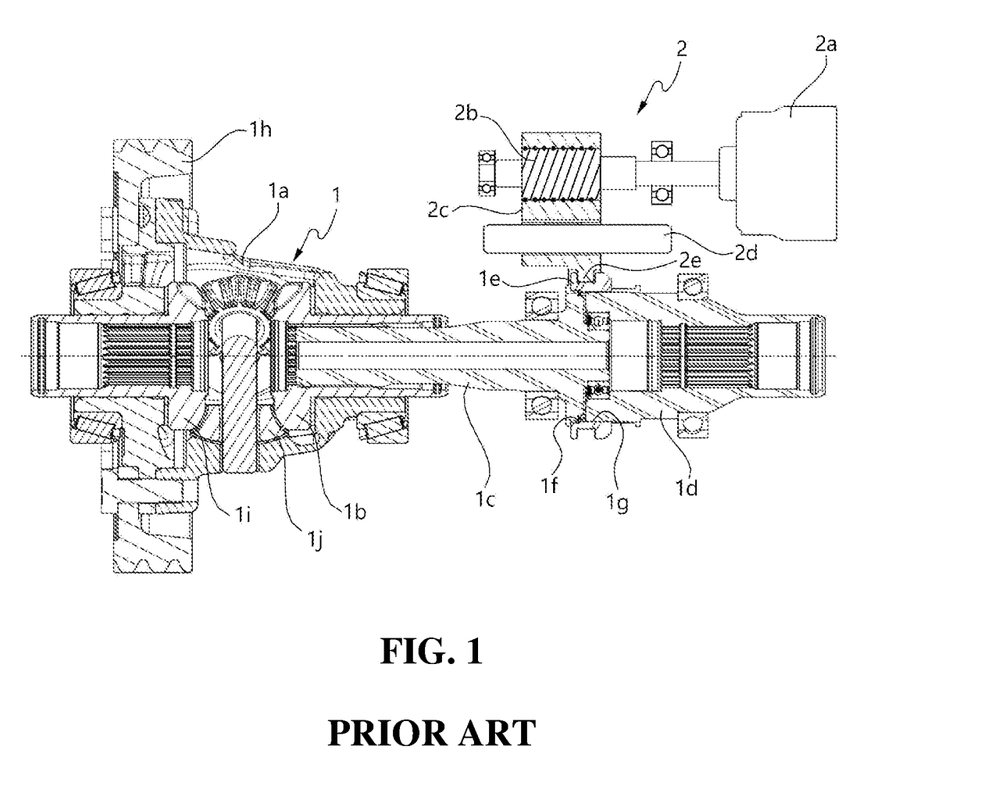
FIG. 1 is a view illustrating a disconnector apparatus in the related art.

FIG. 1 is a view illustrating a disconnector apparatus in the related art. Referring to FIG. 1, the disconnector apparatus includes a differential assembly 1, a disconnector shaft 1c connected to a right differential side gear 1b provided in a differential casing 1a, a disconnector hub 1d connected to a right vehicle wheel (not illustrated), and a disconnector sleeve 1e configured to allow or block the transmission of power between the disconnector shaft 1c and the disconnector hub 1d. A final gear 1h may be coupled to the differential casing 1a.

A left differential side gear 1i is provided in the differential casing 1a and defines a pair of side gears together with the right differential side gear 1b. The right differential side gear 1b and the left differential side gear 1i may engage with four differential pinion gears 1j.

When a ball screw shaft 2b is rotated by an operation of a motor 2a of an actuator device 2, a ball screw nut 2c coupled to the ball screw shaft 2b moves along a guide rail 2d. When the ball screw nut 2c moves, a fork 2e integrated with the ball screw nut 2c may move the sleeve 1e in a connecting or disconnecting direction.

When the disconnector sleeve 1e simultaneously engages with a dog gear part if of the disconnector shaft 1c and a dog gear part 1g of the disconnector hub 1d, an input part (not illustrated) such as a motor or engine and an output part (not illustrated) such as a vehicle wheel are dynamically connected to each other, such that four-wheel drive (4WD) may be implemented.

When the disconnector sleeve 1e moves toward the disconnector hub 1d and the dog gear part if of the disconnector shaft 1c and the dog gear part 1g of the disconnector hub 1d disengage from each other, the transmission of power between the input part such as the motor or engine and the output part such as the vehicle wheel is blocked, such that two-wheel drive (2WD) may be implemented.

However, in the disconnector apparatus in the related art, the overall length and space of the vehicle excessively increase because of the complicated operational structure in which the ball screw shaft, the fork, and the disconnector sleeve are operated in conjunction with one another by the operation of the motor, and the disconnector shaft and the disconnector hub are connected by an operation of the disconnector sleeve, which causes disadvantages in respect to the weight and mountability of the vehicle. Further, in the case of two-wheel drive implemented by disconnecting an auxiliary driving wheel of a four-wheel drive vehicle, the final gear is stopped as the rotation of the input part is stopped, and a high differential occurs, in which the differential pinion gear is rotated at high speed by the rotation of the left differential side gear when the vehicle travels straight at high speed in the state in which the disconnector shaft and the disconnector hub are disconnected. For this reason, noise and vibration occur.

DOCUMENT OF RELATED ART

Patent Document (Patent Document 1) Korean Patent Application Laid-Open No. 10-2017-0123869 (published on Nov. 9, 2017)

SUMMARY OF THE INVENTION

The present invention has been made in an effort to provide a disconnector apparatus, in which a pinion gear may be provided in the disconnector apparatus and engage with a side gear, and high differential may be prevented by a support ring connected to or disconnected from power by a clutch ring.

The present invention has also been made in an effort to provide a disconnector apparatus capable of improving assembly properties and versatility by modularizing an actuator device.

To achieve the above-mentioned objects, the present invention provides a disconnector apparatus including: a support ring mounted in a casing and including a pinion gear mounted in the support ring and configured to engage with a first side gear, the support ring including a first dog gear part provided on one surface directed toward the first side gear; a clutch ring including a second dog gear part provided on one surface facing the support ring, the second dog gear part being configured to engage with the first dog gear part; and a sleeve connected to an actuator device and configured to move in an engagement direction or disengagement direction, the sleeve being connected to the clutch ring and configured to push the clutch ring in a direction toward the support ring or pull the clutch ring in a direction opposite to the support ring.

In the case of four-wheel drive, the sleeve may push the clutch ring in the direction toward the support ring to allow the second dog gear part to engage with the first dog gear part, and in the case of two-wheel drive, the sleeve may pull the clutch ring in the direction opposite to the support ring to allow the second dog gear part to separate and disengage from the first dog gear part.

The actuator device may be including: a housing; a motor coupled to the housing; a ball screw shaft disposed in the housing and rotatably supported on a support member, the ball screw shaft being connected to the motor; a transfer nut coupled to the ball screw shaft and configured to move along the ball screw shaft while being guided by a guide rail mounted in the housing; and a fork integrated with the transfer nut and extending toward the sleeve through an opening portion in the housing, the fork being coupled to surround an outer diameter portion of the sleeve.

A sealing member may be mounted on a coupling surface of the housing to which the motor is coupled.

The support ring may have a through-hole provided in an outer diameter portion thereof and have a coupling hole formed in the other surface thereof, a coupling pin may be coupled to the pinion gear while penetrating the through-hole, and a fixing pin may be coupled to the coupling pin while penetrating the coupling hole.

An inner ring may be coupled in the support ring, the pinion gear may be positioned between the support ring and the inner ring, and the support ring, the pinion gear, and the inner ring may be coupled by the coupling pin.

The clutch ring may include a plurality of leg parts, the casing may have holes corresponding to the leg parts, and the leg parts may be exposed through the holes.

An outer diameter portion of the leg part may be configured as an inclined surface, and an inner diameter portion of the casing, into which the outer diameter portion of the leg part is inserted and with which the outer diameter portion of the leg part is in contact, may be configured as an inclined surface.

The support member may be a bearing.

The sealing member may be an O-ring.

According to the present invention, when the disconnector system is disengaged and the auxiliary driving wheels coast in the two-wheel drive mode of the vehicle, the support ring, which supports the differential gear set including the two side gears and the four pinion gears, rotates, which makes it possible to solve the problem of noise caused by a high differential in the related art.

According to the present invention, the current is applied to the motor only when the clutch ring is coupled, which makes it possible to minimize the current consumption.

According to the present invention, the actuator device is modularized, which makes it possible to ensure assembly properties, facilitate repair, and reduce a defect rate.

The present invention may significantly reduce the overall length, thereby reducing the weight and greatly improving the packaging mountability.

The present invention may eliminate a component such as a disconnector shaft in the related art and reduce the number of components by modularizing the actuator device, which provides advantages in respect to spatial characteristics, weight, and costs.

The present invention may simplify the assembling process by modularizing the actuator device.

According to the present invention, because the actuator device is modularized, the actuator device may be mounted in any speed reducer as long as the space for mounting the clutch ring and the support ring is ensured, which makes it possible to reduce the development period and provide high versatility.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

The present invention may be applied to electric vehicles (EV, battery electric vehicle), internal combustion engine (ICE) vehicles, hybrid electric vehicles (HEV), and the like.

Figure 2:
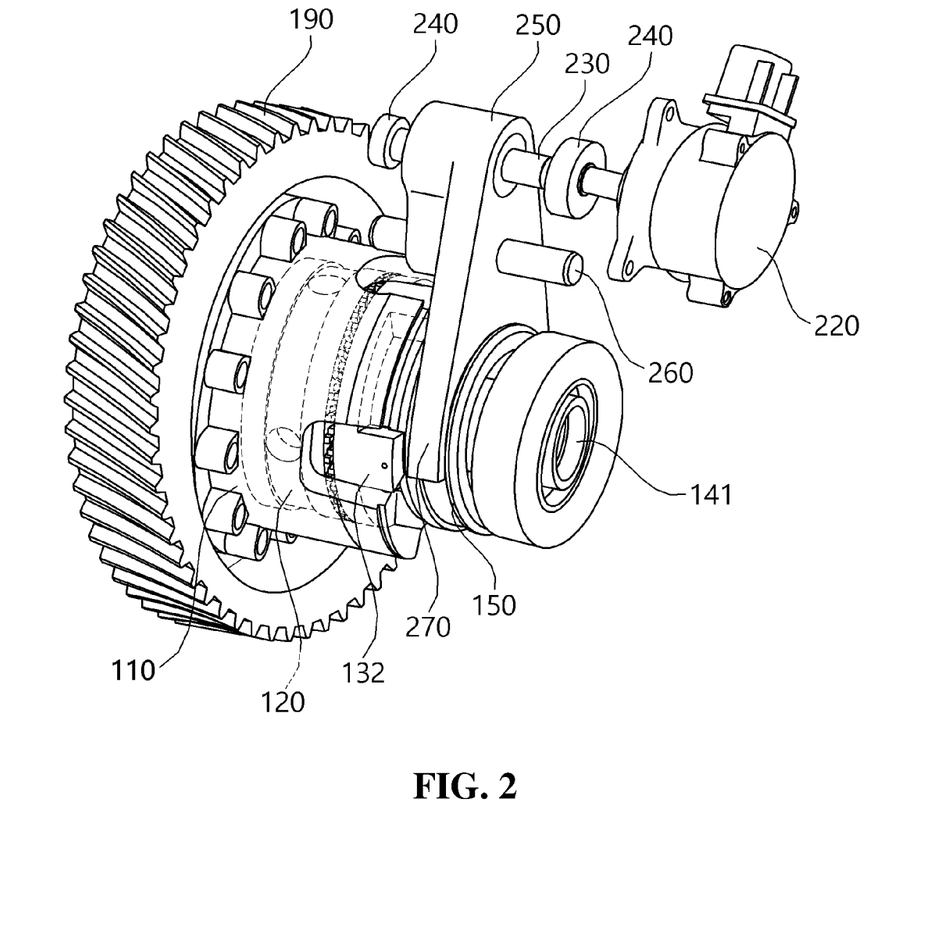
FIG. 2 is a perspective view of the disconnector apparatus according to an exemplary embodiment of the present invention.
Figure 3:
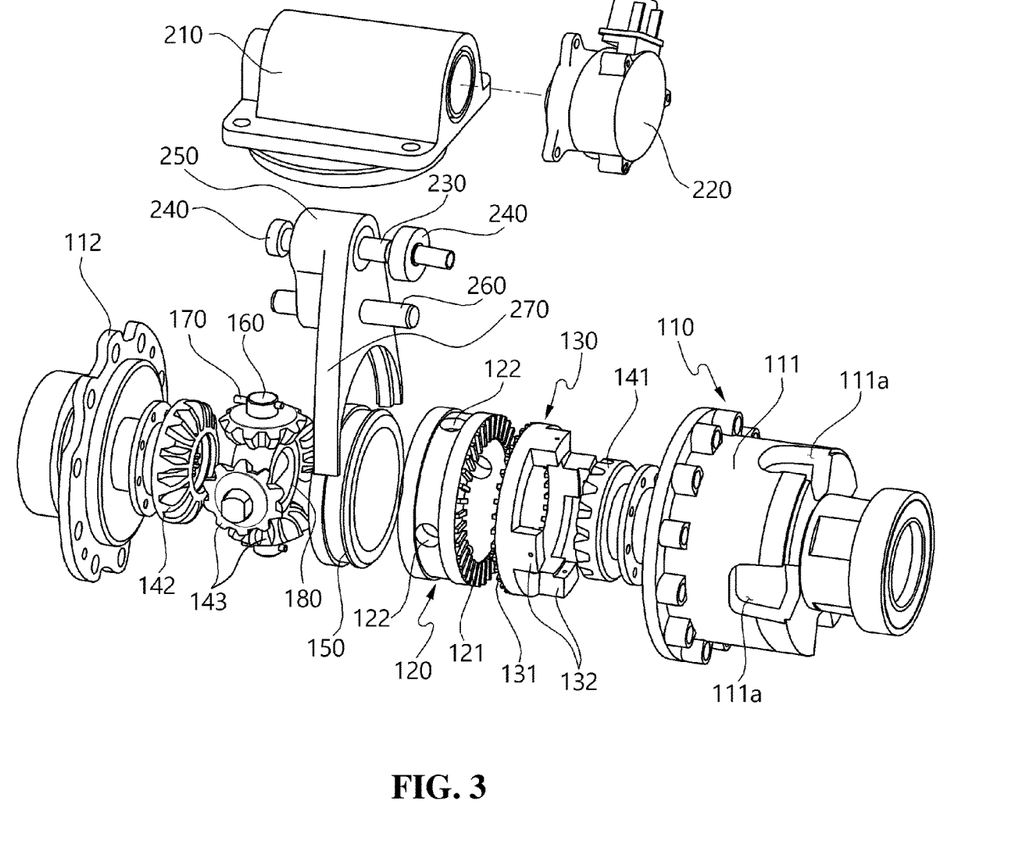
FIG. 3 is an exploded perspective view of the disconnector apparatus according to the exemplary embodiment of the present invention.
Figure 4:
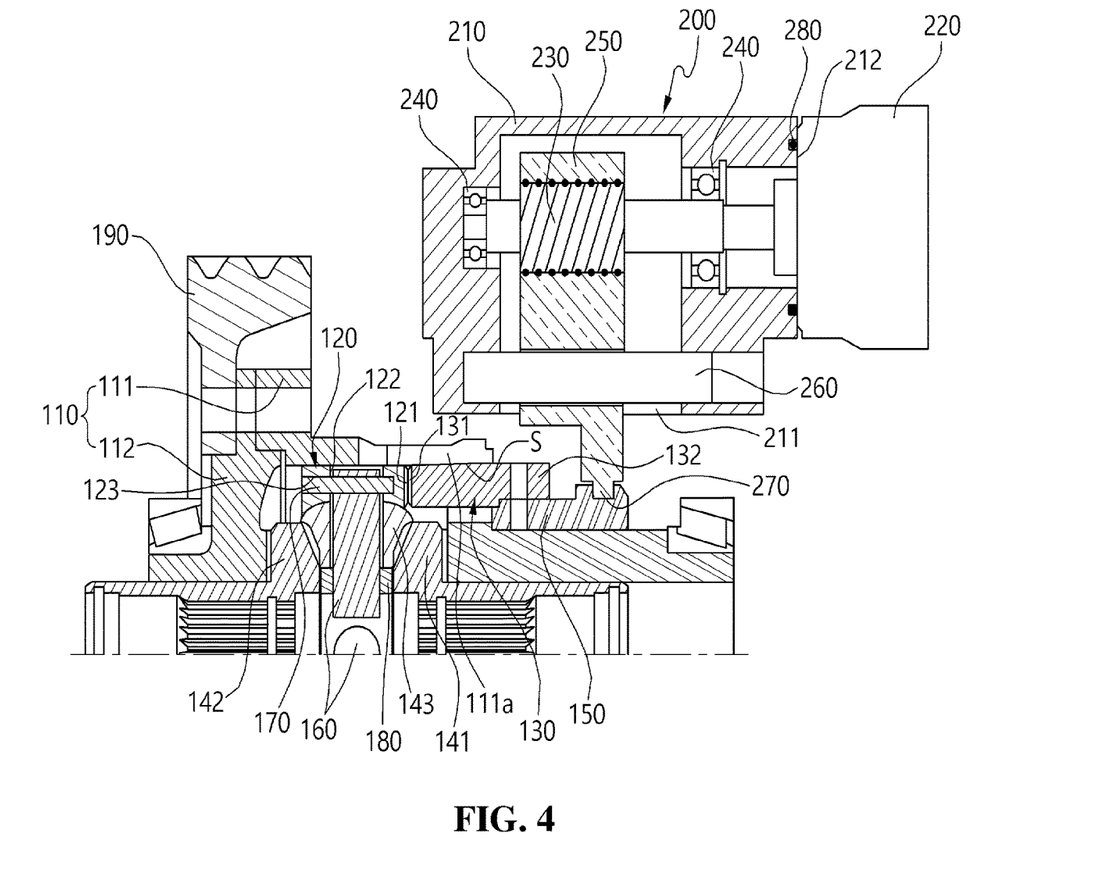
FIG. 4 is a cross-sectional side view of the disconnector apparatus according to the exemplary embodiment of the present invention.

FIG. 2 is a perspective view of the disconnector apparatus according to an exemplary embodiment of the present invention, FIG. 3 is an exploded perspective view of the disconnector apparatus according to the exemplary embodiment of the present invention, and FIG. 4 is a cross-sectional side view of the disconnector apparatus according to the exemplary embodiment of the present invention.

As illustrated in FIGS. 2 to 4, the present invention includes a support ring 120 mounted in a casing 110, a clutch ring 130 disposed in the casing 110 and configured to engage with the support ring 120, and a sleeve 150 configured to move the clutch ring 130 in an engagement or disengagement direction.

A final gear 190 may be coupled to an outer portion of the casing 110. Power of an input part (not illustrated) such as a motor or engine may be transmitted through the final gear 190. The power transmitted to the final gear 190 may be transmitted to the casing 110.

For example, the casing 110 may include a first casing 111 and a second casing 112 coupled to the first casing 111. The first casing 111 and the second casing 112 may be coupled by a coupling member such as a bolt.

A pinion gear 143 is mounted in the support ring 120. The pinion gear 143 engages with a pair of first and second side gears 141 and 142. The pinion gear 143 may be provided as a plurality of pinion gears. For example, four pinion gears 143 may be mounted in the support ring 120.

The support ring 120 includes a first dog gear part 121. The first dog gear part 121 may be provided on one surface of the support ring 120 directed toward the first side gear 141. The first side gear 141 may engage with a second dog gear part 131 of the clutch ring 130.

The support ring 120 includes a through-hole 122 and a coupling hole 123. The through-hole 122 is provided in an outer diameter portion of the support ring 120. The coupling hole 123 is formed in the other surface of the support ring 120.

A coupling pin 160 may be coupled to penetrate a center of the pinion gear 143 through the through-hole 122. A fixing pin 170 may be coupled to penetrate the coupling pin 160 through the coupling hole 123.

An inner ring 180 may be coupled in the support ring 120. The pinion gear 143 may be positioned between the support ring 120 and the inner ring 180. The support ring 120, the pinion gear 143, and the inner ring 180 may be coupled by the coupling pin 160.

The second dog gear part 131 may be provided on one surface of the clutch ring 130 that faces the support ring 120, and the second dog gear part 131 may engage with the first dog gear part 121. The clutch ring 130 may be moved by the sleeve 150.

The clutch ring 130 and the sleeve 150 may be assembled into a single body by bolting or welding and rotated together with the casing 110 by being synchronized with the casing 110.

The clutch ring 130 may have a plurality of leg parts 132. For example, the clutch ring 130 may have four leg parts 132.

Four holes 111a may be formed in the first casing 111 and correspond to the four leg parts 132. The four leg parts 132 may be exposed through the holes 111a.

An outer diameter portion of the leg part 132 is inserted and assembled into an inner diameter portion of the first casing 111. The outer diameter portion of the leg part 132 and the inner diameter portion of the first casing 111 may each have an inclined surface S.

A fork 270 of an actuator device 200 may be coupled to an outer diameter portion of the sleeve 150. The sleeve 150 may be moved in the engagement direction or disengagement direction by an operation of the fork 270.

The sleeve 150 is connected to the clutch ring 130. One end of the sleeve 150 may be inserted and assembled into the leg part 132 of the clutch ring 130.

The sleeve 150 may push the clutch ring 130 in a direction toward the support ring 120 to allow the second dog gear part 131 of the clutch ring 130 to engage with the first dog gear part 121 of the support ring 120. Alternatively, the sleeve 150 may pull the clutch ring 130 in a direction opposite to the support ring 120 to allow the second dog gear part 131 of the clutch ring 130 to separate and disengage from the first dog gear part 121 of the support ring 120.

Specifically, in the case of four-wheel drive, the clutch ring 130 is pushed in the direction toward the support ring 120 by the operation of the sleeve 150, such that the second dog gear part 131 engages with the first dog gear part 121. In the case of two-wheel drive, the clutch ring 130 is pulled in the direction opposite to the support ring 120 by the operation of the sleeve 150, such that the second dog gear part 131, which has engaged with the first dog gear part 121, may separate or disengage from the first dog gear part 121.

The actuator device 200 may be modularized by a housing 210. The actuator device 200 includes the housing 210, a motor 220 coupled to the housing 210, a ball screw shaft 230 configured to be rotated by an operation of the motor 220, a transfer nut 250 configured to rectilinearly move along the ball screw shaft 230 when the ball screw shaft 230 rotates, and the fork 270 integrated with the transfer nut 250 and configured to move together with the transfer nut 250.

The housing 210, which does not receive a high external force, unlike a speed reducer (not illustrated), may be made of a lightweight material such as aluminum or engineering plastic, thereby reducing a weight of the speed reducer.

For example, the motor 220 may be a BLDC motor. The ball screw shaft 230, the transfer nut 250, and the fork 270 are mounted in the housing 210. The ball screw shaft 230 is connected to the motor 220. The ball screw shaft 230 may be rotatably supported in the housing 210 by means of a support member 240 such as a bearing.

Transfer power of the fork 270, which is insufficiently provided only by the motor 220, may be amplified by the ball screw shaft 230 and then transmitted, which enables precision control.

The transfer nut 250 is coupled to the ball screw shaft 230. When the ball screw shaft 230 rotates, the transfer nut 250 may stably move while being guided by a guide rail 260 mounted in the housing 210.

The guide rail 260 is penetratively coupled to the transfer nut 250, and two opposite ends of the guide rail 260 are supported by the housing 210.

The fork 270 extends toward the sleeve 150 through an opening portion 211 of the housing 210. The fork 270 is coupled to the outer diameter portion of the sleeve 150 and surrounds the outer diameter portion of the sleeve 150.

The opening portion 211 of the housing 210 may be formed as a space that conforms to a stroke of the fork 270 so that the fork 270 may move smoothly.

A sealing member 280, such as an O-ring, may be coupled to the housing 210. The sealing member 280 may be coupled to a coupling surface 212 of the housing 210 to which the motor 220 is coupled.

The sealing member 280 may prevent liquid or oil mist, which may be produced by lubricating oil in the speed reducer (not illustrated), from entering the motor 220.

Next, an operation in the case of two-wheel drive of the present invention will be described.

Figure 5:
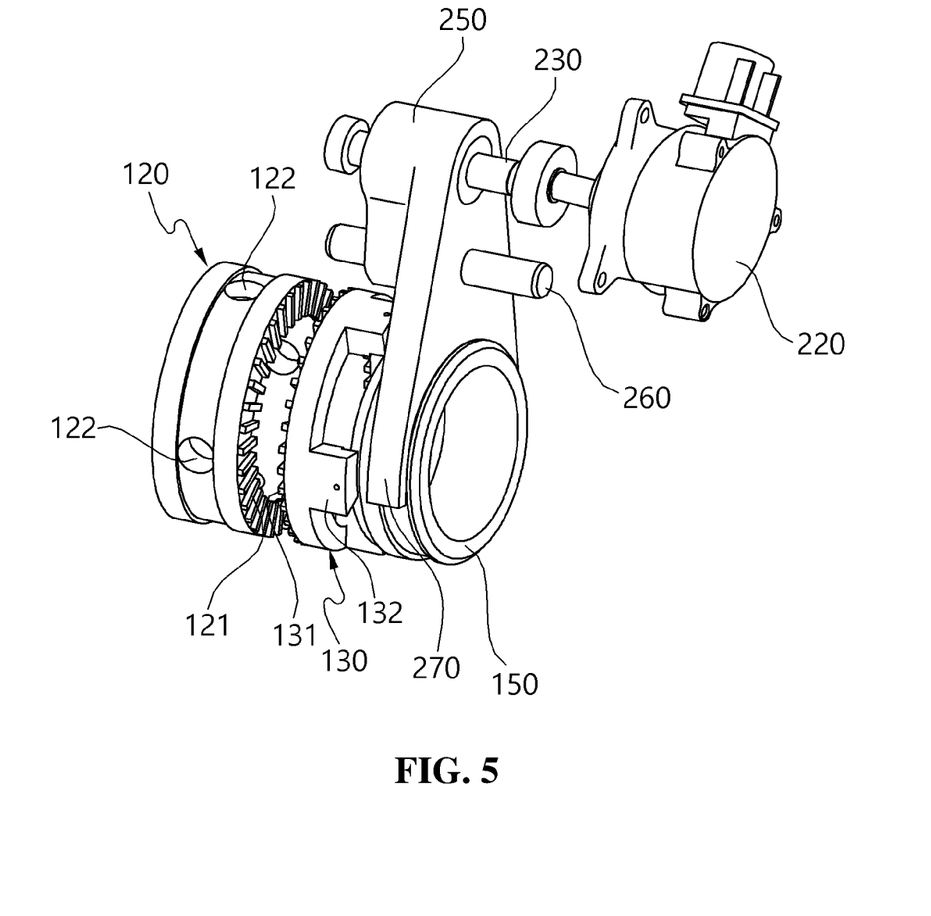
FIG. 5 is a view illustrating a process in which a support ring and a clutch ring according to the exemplary embodiment of the present invention engage with each other.

FIG. 5 is a view illustrating a process in which the support ring and the clutch ring according to the exemplary embodiment of the present invention engage with each other.

As illustrated in FIGS. 4 and 5, when the ball screw shaft 230 is rotated by the operation of the motor 220, the transfer nut 250 moves rearward. When the transfer nut 250 moves rearward, the fork 270 integrated with the transfer nut 250 moves the sleeve 150 rearward.

Because the sleeve 150 pulls the clutch ring 130 in the direction opposite to the support ring 120 while moving rearward, the second dog gear part 131 may move away and disengage from the first dog gear part 121. Therefore, the two-wheel drive (2WD) may be implemented.

In the disengagement state, power of the input part (not illustrated) such as the motor or the engine is blocked. The power of the input part is not transmitted to the final gear 190.

Two opposite auxiliary driving wheels (not illustrated) coast, rotational force of the two opposite auxiliary driving wheels may be transmitted to the first side gear 141 and the second side gear 142, such that the first side gear 141 and the second side gear 142 may rotate.

Because the first side gear 141 and the second side gear 142 engage with the pinion gear 143, the support ring 120 may rotate together with the first side gear 141 and the second side gear 142 as the first side gear 141 and the second side gear 142 rotated.

In this case, because the support ring 120 is separated from the casing 110, only the support ring 120 rotates, but the casing 110 does not rotate. Therefore, the two-wheel drive in which only the main driving wheels drive the vehicle and the auxiliary driving wheels coast may be implemented.

Because the electric vehicle travels at a high rotational speed, high differential noise may certainly occur. However, the present invention may solve the problem of the occurrence of high differential noise in the related art because the support ring 120 rotates in the casing 110.

Next, an operation in the case of four-wheel drive of the present invention will be described.

Referring to FIGS. 4 and 5, when the ball screw shaft 230 is rotated by the operation of the motor 220, the transfer nut 250 moves forward. When the transfer nut 250 moves forward, the fork 270 integrated with the transfer nut 250 moves the sleeve 150 forward.

Because the sleeve 150 pushes the clutch ring 130 in the direction toward the support ring 120 while moving forward, the second dog gear part 131 of the clutch ring 130 engages with the first dog gear part 121 of the support ring 120. Therefore, the four-wheel drive (4WD) may be implemented.

In the case of the four-wheel drive, power of the input part (not illustrated) such as the motor or the engine may be transferred to the final gear 190.

The power of the input part may be transmitted to the casing 110 through the final gear 190. The support ring 120 may rotate as the casing 110 rotates. The casing 110 and the support ring 120 are coupled and move together.

When the support ring 120 rotates, the power is transmitted to both the first and second side gears 141 and 142 that engage with the pinion gear 143, such that the first and second side gears 141 and 142 may rotate.

When the first side gear 141 and the second side gear 142 rotate, the power is transmitted to the two opposite auxiliary driving wheels connected to the first and second side gears 141 and 142, such that the two opposite auxiliary driving wheels may rotate. Therefore, the four-wheel drive may be implemented as the power of the input part is transmitted to the auxiliary driving wheels as well as the main driving wheels.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A disconnector apparatus comprising:
   a support ring mounted in a casing and including a pinion gear mounted in the support ring and configured to engage with a first side gear, the support ring including a first dog gear part provided on one surface directed toward the first side gear;
   a clutch ring including a second dog gear part provided on one surface facing the support ring, the second dog gear part being configured to engage with the first dog gear part; and
   a sleeve connected to an actuator device and configured to move in an engagement direction or disengagement direction, the sleeve being connected to the clutch ring and configured to push the clutch ring in a direction toward the support ring or pull the clutch ring in a direction opposite to the support ring,
   wherein the actuator device is a modularized device comprising:
   a housing;
   a motor coupled to the housing;
   a ball screw shaft disposed in the housing and rotatably supported on a support member, the ball screw shaft being connected to the motor;
   a transfer nut coupled to the ball screw shaft and configured to move along the ball screw shaft while being guided by a guide rail mounted in the housing; and
   a fork integrated with the transfer nut and extending toward the sleeve through an opening portion in the housing, the fork being coupled to surround an outer diameter portion of the sleeve.

2. The disconnector apparatus of claim 1, wherein in the case of four-wheel drive, the sleeve pushes the clutch ring in the direction toward the support ring to allow the second dog gear part to engage with the first dog gear part, and
   wherein in the case of two-wheel drive, the sleeve pulls the clutch ring in the direction opposite to the support ring to allow the second dog gear part to separate and disengage from the first dog gear part.

3. The disconnector apparatus of claim 1, wherein a sealing member is mounted on a coupling surface of the housing to which the motor is coupled.

4. The disconnector apparatus of claim 3, wherein the sealing member is an O-ring.

5. The disconnector apparatus of claim 1, wherein the support ring has a through-hole provided in an outer diameter portion thereof and has a coupling hole formed in another surface thereof, a coupling pin is coupled to the pinion gear while penetrating the through-hole, and a fixing pin is coupled to the coupling pin while penetrating the coupling hole.

6. The disconnector apparatus of claim 5, wherein an inner ring is coupled in the support ring, the pinion gear is positioned between the support ring and the inner ring, and the support ring, the pinion gear, and the inner ring are coupled by the coupling pin.

7. The disconnector apparatus of claim 1, wherein the clutch ring includes a plurality of leg parts, the casing has holes corresponding to the leg parts, and the leg parts are exposed through the holes.

8. The disconnector apparatus of claim 7, wherein an outer diameter portion of the leg parts is configured as an inclined surface, and an inner diameter portion of the casing, into which the outer diameter portion of the leg parts is inserted and with which the outer diameter portion of the leg parts is in contact, is configured as an inclined surface.

9. The disconnector apparatus of claim 1, wherein the support member is a bearing.

* * * * *